Oct. 4, 1960
J. N. MORRELL
2,954,703
FAST-ACTING VALVE SYSTEM
Filed Oct. 17, 1956
2 Sheets-Sheet 1
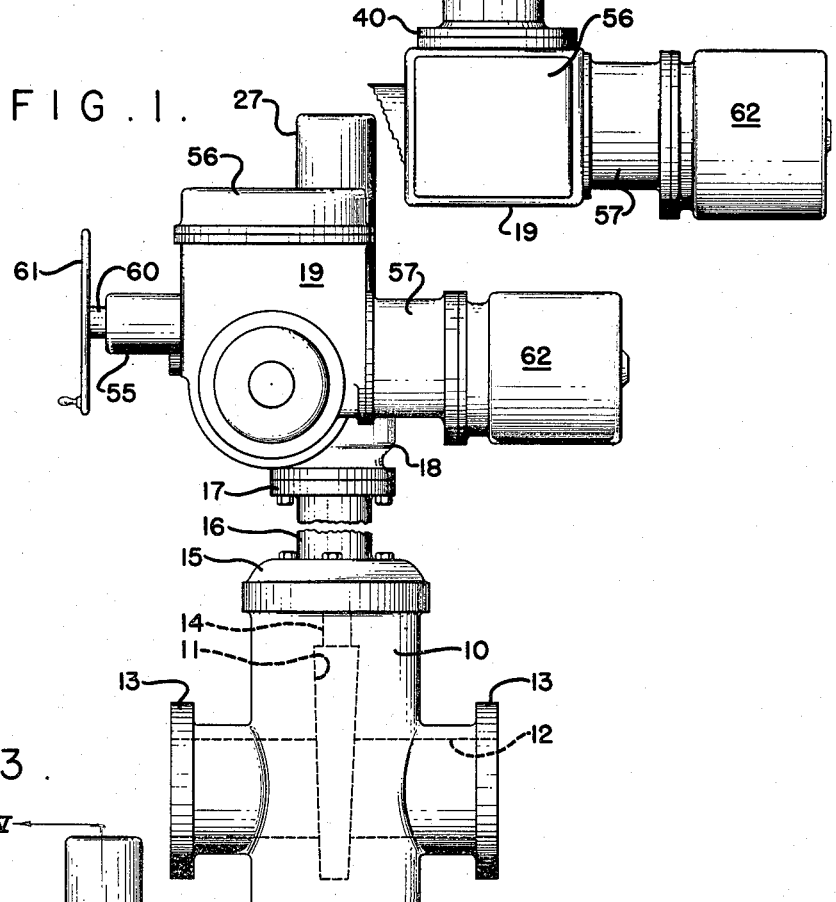
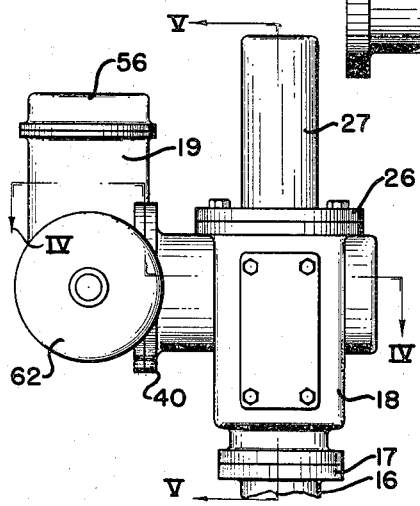
INVENTOR
JAMES N. MORRELL
BY
*his attorneys*

Oct. 4, 1960    J. N. MORRELL    2,954,703
FAST-ACTING VALVE SYSTEM
Filed Oct. 17, 1956    2 Sheets-Sheet 2

INVENTOR.
JAMES N. MORRELL
BY
his attorneys

United States Patent Office 2,954,703
Patented Oct. 4, 1960

2,954,703

FAST-ACTING VALVE SYSTEM

James N. Morrell, Piney Point, Tex.

Filed Oct. 17, 1956, Ser. No. 616,448

2 Claims. (Cl. 74—422)

This invention relates to a fast-acting valve system for relatively rapidly moving the movable valve element in a valve, such as a gate valve, in an opening or closing direction as desired. More particularly, this invention pertains to the fast regulation of valves of relatively larger size, in combination with a powered valve control unit which, if desired, may also have provision for manual drive and, in addition, may be of the non-coincidental class.

Valves of relatively larger size, such as gate valves which may be employed in ducts or in pipelines for fluids under pressure, are manufactured by valve makers and commonly provided with a threaded valve stem which extends from the movable valve disc member upwardly through the bonnet and yoke of the valve. The lead of such thread is usually made small enough to provide a self-locking or irreversible relation between the nut and valve stem in the case of a so-called "rising" stem valve and between the corresponding elements used in the so-called "non-rising" stem valve. In such a valve stem, the opening or closing movement thereof is relatively slow due to the large number of revolutions which have to be made by such nut or corresponding element to translate the valve disc through a given distance, whether the valve is provided with an individual manual drive or an individual power drive or a combined coincidental or non-coincidental power-and-manual drive.

By means of this invention, such shortcomings of prior practices have been overcome. Instead, valves including those of relatively large size may be employed in accordance with the teaching hereof and are relatively quickly opened or closed as desired with full retention of a self-locking, that is, an irreversible feature between the valve drive and the translatable valve closure element, such as the disc or plate in a gate valve or the like. As a consequence, industrial operations requiring fast valve action for processing, safety or other purposes, can be fully accommodated by and through my new system irrespective of whether the drive is a combined power-and-manual coincidental or non-coincidental or an individual power drive or an individual manual drive.

Other and further advantages and features of this invention will be apparent from the following description and the accompanying drawings, which are illustrative of one embodiment only, in which Figure 1 is a side view of one embodiment of my new valve system applied to a gate valve and including for illustrative purposes a non-coincidental power-and-manual drive means combined therewith;

Figure 2 is a plan view of the top of part of the outside of the new combination shown in Figure 1;

Figure 3 is a view from one end of the outside of the new construction shown in Figure 1;

Figure 4:
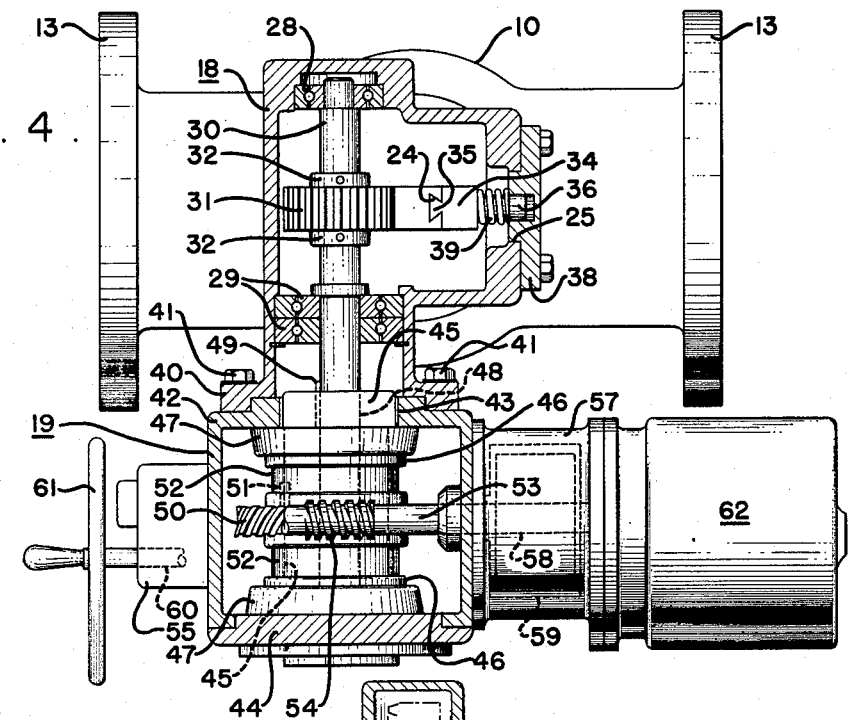
Figure 4 is a view, partly in section, taken along line IV—IV of Figure 3.

Referring to the drawings, a gate valve 10 may be provided and have therein a valve disc closure 11 adapted to be translated to partially or fully open and close the "run" opening 12 extending through the valve between the flanges 13 when the valve is fully opened. Such flanges 13 normally are connected to continuing ducts or a pipeline or have some other connection in situations where my new valve system may be used. As shown, valve disc 11 is provided with a "rising" stem 14 which instead of being threaded as in the usual situation, is made of cylindrical stock and is unthreaded, thereby materially reducing manufacturing expense. Valve stem 14 extends upwardly through a bonnet 15 and yoke 16, preferably enclosed to keep dirt and dust out of the internal parts of my new system, such yoke 16 terminating in an annular flange 17 on which an actuation chamber 18 is mounted in combinative relation to and with a valve control unit 19 affixed thereto. For purposes of illustrating this invention, unit 19 is shown in the form of a non-coincidental valve control, that is, one in which clutch mechanism therein provides that when the power drive means is operatively connected, the manual drive means is disconnected, and vice versa, and unit 19 may have its clutch mechanism in a clutch chamber 57 made in accordance with the novel clutch mechanism in my copending application Serial No. 513,763 filed June 7, 1955, now Patent No. 2,916,947 or other mechanism may be employed.

Valve stem 14 may be provided at its upper end with a reduced projection 20 which is externally threaded for binding or locking engagement with the internal threads in a recess 21 in the bottom of a rack 22. Rack 22 is provided with teeth 23 on one face thereof and a longitudinally extending guide recess 24 on the opposite side thereof. Thus, rack 22 in effect is a part of valve stem 14 and, indeed, stem 14 may be made longer, if desired, and teeth 23 and recess 24 may be cut directly into stem 14. Actuation chamber 18 encloses rack 22 and is provided with an opening 25 adjacent the recessed side of the rack. The top of chamber 18 may be closed by a cover 26 having an enclosed stem protector tower portion 27 in which the top portion of rack 22 can rise and descend in the course of movements thereof. It will be seen that as rack 22 is caused to rise, valve closure 11 will move in an opening direction between fully closed and fully open positions and as rack 22 is caused to descend, as viewed in Figure 5, movable valve element 11 will be caused to move in a closing direction between its extreme positions.

Roller thrust bearings 28 and 29 may be suitably mounted in chamber 18 to journal an extension shaft 30 therein, such bearings preferably holding such shaft against axial movement. A drive pinion 31 is mounted in fixed position lengthwise of shaft 30 between adjustably fixed collars 32 so that the plane of pinion 31 is in alignment with the longitudinal plane through the center of rack 22. Pinion 31 is keyed to shaft 30 so that as it is turned by shaft 30 in one direction or the other, it will correspondingly move rack 22 and thereby operate valve 10. As shown, pinion 31 is a spur gear with teeth 33 meshing engagement with teeth 23 of rack 22 but such respective sets of teeth may also be of herringbone spiraling character if desired.

Figure 5:
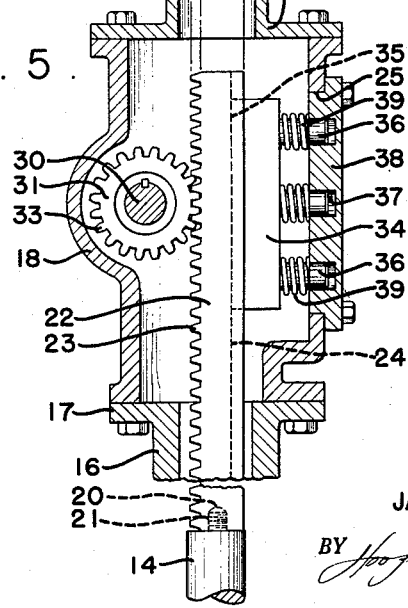
Figure 5 is a view in section taken along line V—V of Figure 3.

A guide block 34 is provided having a tongue 35 in slidable engagement with recess 24. The outer face of block 34 is provided with outstanding posts 36 normal thereto and of a diameter to slidably fit holes 37 on the inner face of a plate 38 which can be bolted to chamber 18 to close opening 25 as shown in Figures 4 and 5. Springs 39 coiled about the posts 36 may be utilized to press block 34 toward rack 22 and thereby press rack 22 into engagement at all times with pinion 31 for quiet and stable functioning of the respective parts.

One side of chamber 18 is provided with a peripheral flange 40 to which unit 19 may be affixed as by the bolts 41 in a so-called side-mounted manner. Unit 19 is provided with a gear housing 42 for the gear section thereof, such housing 42 having an opening 43 in alignment with the axis of shaft 30 and another opening at the other end closed by a cover 44. A socket 45 is mounted in section 42 and rotatably but not axially movably mounted in bearings 46 which in turn are in annular recessed members 47 respectively a part of the housing 42 and cover 44. The outer end of shaft 30 extends into a bore 48 in socket 45 and is keyed thereto by a spline key 49 so that shaft 30 is turned as socket 45 is turned but may be readily assembled and disassembled therefrom when bolts 41 are taken out and unit 19 removed.

Socket 45 is surrounded in the embodiment shown by a worm wheel 50 which may be provided with an axial projection 51 to operatively engage a coacting projection fastened to the exterior of socket 45, spacing collars 52 being used to maintatin the longitudinal position of worm wheel 50 relative to socket 45. A worm shaft 53 is journaled in housing 42 in a manner such that as shaft 53 is rotated it rotates a worm 54 secured thereto. Shaft 53 preferably is permitted some axial movement and cooperates with torque and limit control mechanism which may be contained in an extension compartment 55 and a switch compartment 56 in unit 19.

The ratio between the worm 54 and the worm wheel or gear 50 is preferably selected so that the mechanism is made self-locking or irreversible at that point, that is, forces exerted by the valve closure element tending to move rack 22 and thereby rotate shaft 30 are prevented from so doing, whereas when worm shaft 53 and worm 54 are rotated as by a driving source, extension shaft 30 will be turned to rotate pinion 31 and rack 22 in a positive manner to actuate valve 10.

The rotation of worm shaft 53 is accomplishable in the illustrated embodiment through the medium of a clutch shaft 58 in the clutch mechanism section 59 of chamber 57. Clutch shaft 58 in turn is moved through a suitable clutch part in either direction as desired by a power or manual driving action. Thus, in a power operation, shaft 58 will be rotated when reversible electric motor 62, preferably of a torque type, is energized. Or, in a manual, shaft 58 may be rotated by the turning of handwheel shaft 60 when handwheel crank 61 is turned in the appropriate direction. Oftimes, in a valve control, motor 62 will be operable from a distance through suitable electric wiring while actuation by means of movement of handwheel 61 may be reserved for unusual or emergency operations as in a case of a power failure. Although motor 62 is described in terms of being an electric motor, it will be recognized that other types of motors employing pressure fluids to operate the same may be used in place of electric motor 62.

In operation, my new fast-acting valve system thereby enables a valve having a translatable valve closure element therein, that is, one that is caused to rise and descend, for example, rather than being rotated in the course of actuation, to operate by virtue of my new construction with a rapidity not previously obtainable. Thus, in the opening of valve 10, valve disc 11 can be made to rise fast either in a power-driven opening direction cycle by energization of motor 62 or in manual-driven opening direction cycle by turning of handwheel 61, which, in turn, will rotate shaft 53 and worm 54 and turn socket 45 and thereby shaft 30 and pinion 31 to lift rack 22 to any desired opening of valve 10 up to full open position represented by the dotted line position of rack 22 shown in Figure 5. Conversely, rotation of motor 62 or of handwheel 61, as the case may be, in the opposite closing direction will rapidly move rack 22 down the desired distance up to its extreme closing limit in which case valve 10 would be completely closed by disc 11. As a consequence, valve systems employing my invention can be utilized for processing, safety and other purposes where fast action is requisite.

Various modifications may be made in the illustrated embodiment and in either or both of the valve control and valve elements of my invention without departing from the spirit of my invention or the scope of the appended claims.

I claim:

1. In a fast-acting operator system for a valve stem, apparatus comprising, in combination, a valve stem, a toothed rack positioned at the top of said valve stem in axial alignment therewith, said rack being reciprocable and fixed in a positive manner to said valve stem to operate the same, a longitudinally extending guide recess in said rack on the side thereof opposite to the toothed side, a guide block having a tongue slidably engaging said guide recess, a spur toothed pinion in engagement at all times with the teeth of said rack, spring means to press said guide block in the general direction of said pinion, means to hold said guide block in axially fixed position, an extension shaft carrying said pinion in keyed relation thereto, said extension shaft being rotatably but not axially movable, a rotatable socket having an axial bore therein, means for splinedly connecting said socket to said extension shaft, a worm wheel surrounding said socket and adapted to be operatively connected to and rotate said socket as said worm wheel is turned, a worm shaft, a worm fixed on said worm shaft and in engagement with said worm wheel, the gear ratio between said worm wheel and said worm being a self-locking ratio, and reversible means to rotate said worm shaft to a selected extent to operate said valve stem in a fast-acting manner in a selected opening or closing direction.

2. In a fast-acting operator system for a valve stem, apparatus comprising, in combination, a valve stem, a toothed rack fixed adjacent the top of said valve stem in axial alignment therewith, said rack being reciprocable and fixed in a positive manner to said valve stem to operate the same, a longitudinally extending guide member on said rack on the side thereof opposite to the toothed side, a guide block slidably engaging said guide member, a toothed pinion in engagement with the teeth of said rack, an extension shaft fixed to said pinion, a toothed driven member positioned in coaxial relation to said extension shaft and operatively connectible thereto in a positive driving relation to rotate said extension shaft as said toothed driven member is turned, a rotatable drive shaft, a toothed drive member fixed to said drive shaft and in engagement with said toothed driven member, reversible drive means for said drive shaft, and means for holding one of said shafts to fix the selective relative positions of both as determined by said drive means.

References Cited in the file of this patent

UNITED STATES PATENTS

| | | |
|---|---|---|
| 619,047 | Mayer | Feb. 7, 1899 |
| 916,831 | Bettinger | Mar. 30, 1909 |
| 1,557,863 | Mrvosh | Oct. 20, 1925 |
| 1,582,715 | Wensley | Apr. 27, 1926 |
| 1,843,347 | Steelsmith | Feb. 2, 1932 |
| 1,991,081 | Charpier | Feb. 12, 1935 |
| 2,052,947 | Shivers | Sept. 1, 1936 |
| 2,145,146 | Williams | Jan. 24, 1939 |
| 2,580,122 | Parker | Dec. 25, 1951 |
| 2,615,469 | Schofield | Oct. 28, 1952 |